(12) United States Patent
Walter et al.

(10) Patent No.: US 6,623,362 B1
(45) Date of Patent: Sep. 23, 2003

(54) ELASTIC SHAFT COUPLING

(75) Inventors: Jürgen Walter, Haltern (DE); Ulrich Falz, Dortmund (DE)

(73) Assignee: Hackforth GmbH, Herne (DE)

( * ) Notice: Subject to any disclaimer, the term of this patent is extended or adjusted under 35 U.S.C. 154(b) by 0 days.

(21) Appl. No.: 09/700,472

(22) PCT Filed: May 17, 1999

(86) PCT No.: PCT/EP99/03401

§ 371 (c)(1), (2), (4) Date: Feb. 5, 2001

(87) PCT Pub. No.: WO99/60283

PCT Pub. Date: Nov. 25, 1999

(30) Foreign Application Priority Data

May 15, 1998 (DE) .......................... 198 21 948

(51) Int. Cl.[7] ................................. F16D 3/68
(52) U.S. Cl. .......................... 464/17; 464/92
(58) Field of Search .................. 464/17, 92, 88, 464/93, 81; 285/363

(56) References Cited

U.S. PATENT DOCUMENTS

| 1,790,516 | A | * | 1/1931 | Williams | 464/17 |
| 2,295,316 | A | | 9/1942 | Yates | |
| 2,742,769 | A | | 4/1956 | Gleeson | |
| 3,545,231 | A | | 12/1970 | Downey | |
| 4,094,520 | A | * | 6/1978 | Ng et al. | 285/363 X |
| 4,563,166 | A | * | 1/1986 | Walter et al. | 464/92 X |
| 4,763,767 | A | * | 8/1988 | Lanzarini et al. | 464/92 X |
| 4,929,115 | A | * | 5/1990 | Lunke et al. | 464/93 X |
| 6,234,903 | B1 | * | 5/2001 | Walter et al. | 464/17 |

FOREIGN PATENT DOCUMENTS

| DE | 37 10 390 | | 10/1988 | |
| FR | 1 267 022 | | 11/1961 | |
| GB | 2 094 936 | * | 9/1982 | |
| SU | 571637 | * | 9/1977 | 464/92 |

* cited by examiner

Primary Examiner—Greg Binda
(74) Attorney, Agent, or Firm—Collard & Roe, P.C.

(57) ABSTRACT

An elastic shaft coupling which as a transmission element comprises at least one torsion element with an elastically deformable elastomer body on which axial flange connections are fixedly mounted on the input and output sides. The axial width of the elastomer body increases radially from the inside towards the outside. To reduce or better distribute the local mechanical and thermal load on the elastomer body resulting from the dynamic load, the invention provides for the axial width of the elastomer body to increase radially from the inside to the outside more than proportionally, at least in sections.

4 Claims, 3 Drawing Sheets

ELASTIC SHAFT COUPLING

Applicants claim priority under 35 U.S.C. §119 of GERMAN Application No. 198 21 948.2 filed on MAY 15, 1998. Applicants also claim priority under 35 U.S.C. §365 of PCT/EP99/03401 filed on MAY 17, 1999. The international application under PCT article 21(2) was not published in English.

With such shaft couplings, two connection flanges are fixed by vulcanization to the axial faces of at least one rubber body serving as the transmission element. The shaft coupling is integrated into the drive train via the connection flanges, whereby the torque is transmitted exclusively via the rubber material of the elastomer body. When under load, said torsion elements are subjected to rotational shear around the axis of the shaft because of their elasticity. Torque variations are decoupled in this connection from the connected drive train due by the elasticity of the rubber body or bodies.

BACKGROUND

The present invention relates to an elastic shaft coupling which, as a transmission element, has at least one torsion element with an elastically deformable elastomer body to which axial flange connections are attached in a fixed manner on the sides upon which force is applied and removed.

The transmission elements are subjected to substantial dynamical stress under the load changes typically occurring during operation. Such dynamical stress is reflected on the one hand by the considerable elongation stress of the connection between the connection flanges and the elastomer body. On the other hand, viscoelastic effects, i.e. inner friction of the elastomer materials, lead to conversion of mechanical energy into heat. This may lead to the occurrence of local thermal peaks, so called heat clusters because of the relatively low thermal conductivity of the rubber material. Material-specific limit temperatures should basically not be exceeded in this connection because that may otherwise lead to local damage. This applies to a special degree to the zone of the outer jacket surfaces because the expansion reached the highest values in said zone. The result thereof is particularly high load acting on the transition between the rubber-and-metal joint, which, of course, is noteworthy also because of the notch effect occurring on the outer limit edge. Furthermore, heating occurring on the surface of the material, which is accompanied by a mechanical load, should not exceed preset limit values because aging processes occurring there would otherwise be accelerated.

The problems explained above have been successfully counteracted in the prior art through constructional developments, so that rubber couplings are viewed since a fairly long time as entirely reliable construction elements with advantageous operating properties. Through particularly constructive developments, local loads are reduced in that connection to a harmless measure. For this purpose, the occurrence of local mechanical or thermal loads is either limited directly, and/or provision is made for effective cooling. A few measures that are advantageous in this regard are specified, for example in DE 37 10 390 C2, where the connection flanges are provided with the shape of the shell of a cone, so that the rubber body is provided with a V-shaped cross section that widens linearly outwards. Owing to the fact that the axial width of the elastomer body increases radially viewed from the inside to the outside, the outer fibers have a greater elastic length. The lower local expansion resulting therefrom is advantageous in view of the development of heat and the load to which the rubber-metal interfaces are subjected.

The collected lost heat is effectively dissipated via other measures such as a segmented design of the transmission elements, as well as by providing for through-extending cooling windows.

However, the trend to increasingly higher power densities, combined at the same time with a smaller installation space requires a more far-reaching optimization of the elastomer couplings known in the prior art.

An elastic shaft coupling is known from U.S. Pat. No. 2,742,769 which has an elastomer body between two connection flanges. However, it has been found that such elastomer bodies quickly fail in the presence of varying torques mainly on the outer radius even though the torque to be withstood stationarily is not reached.

An elastic shaft coupling with elastomer bodies of the type used in smaller mechanical drives is introduced also in U.S. Pat. No. 2,295,316. However, the shape of the elastomer bodies between the ends of the shaft leads to the fact that the elastomer body is destroyed by local overloads especially at the elastomer-metal interface.

For solving said problem the invention proposes that the axial width of the elastomer body be increased viewed radially from the inside to the outside more than proportionally at least by sections whereby the axial connection flanges (2) have chalice- or bell-shaped shapes in a continuously sweeping form relative to each other without a bend in the elastomer-metal interface.

According to the invention, the cross section of the elastomer body has at least an inner and one outer radial zone, whereby the radial width grows sooner in the outer than in the inner zone as the radius increases. While the width of the elastomer body in the prior art increases only linearly over the entire cross section because of the cone shell-shaped connection flanges, and therefore proportionally, the effective elastic width increases more rapidly to the outside according to the invention, at least by sections.

According to a particularly advantageous embodiment of the invention, provision is made that the cross section of the elastomer body is widened in the form of a bell viewed radially from the inside to the outside. The bell-shaped design, which could be called also chalice- or tulip-shaped, means there is a continuously curved, rounded transition between the individual zones. Avoiding a bent expanse of the connection flanges leads to a uniform load acting on the rubber-metal interface, and unsteadiness is avoided to the greatest possible extent.

The invention, of course, can be realized in the same way both on a through-extending, ring-shaped and a segmented elastomer body.

The special advantage of the invention ensues from the fact that the elastic length in the path in the outer zones is coordinated in a superior way with the mechanical and thermal load occurring there more than proportionally with the radius. Furthermore, the outer jacket surface of the elastomer body is enlarged in this connection to an extent such that lower local elongations issue, and superior dissipation of heat into the ambient air takes place at the same time. The aging effects mentioned above are clearly reduced in this way. The given amount of the overall cross sectional area of the elastomer body results overall in a more homogeneous load. Therefore, the transmittable power density is increased as compared to the designs of couplings known, for example from DE 37 10 390 C2 already cited above, and also DE 33 10 695 C2. This means that the coupling can be designed smaller for a given torque and consequently takes up less installation space. As an alternative it is possible in connection with a coupling with unchanged dimensions to transmit an accordingly high power.

For solving the problems explained above, provision is made according to a particularly advantageous, alternative embodiment that the transmission element has at least one inner elastomer body and at least one outer elastomer body, whereby the elastomer bodies are arranged coaxially with the axis of the coupling and with a radial spacing from each other and have a common connection flange on the driving side and the driven side.

Such an embodiment as defined by the invention can be realized in the same way with couplings according to the prior art cited above, and in conjunction with the elastomer bodies that widen toward the outside more than proportionally as defined by the invention.

As opposed to the prior art, a torsion element designed as defined by the invention has one-piece elastomer bodies not only in the radial direction, but at least two or more ring- or segment-shaped separate elastomer bodies that have a radial spacing from each other, whereby said elastomer bodies each have a radially through-extending, common connection flange both on the driving side and the driven side. This means that the outer elastomer bodies surround the inner elastomer bodies, thereby forming cooling channels that extend through in the peripheral direction.

A special advantage of the invention issues from the fact that the air-flushed cooling channels extending through in the peripheral direction are axially limited by the metallic connection flanges. The heat collected under dynamic load in the poorly thermally conductive rubber material of the elastomer bodies is dissipated in a particularly good way in this manner on account of the fact that air flowing along the cooling channels is directly transferring the heat to the connection flanges, which have good thermal conductivity.

The development of critical local thermal peak loads in the rubber material can be additionally prevented in connection with the invention by providing the highly stressed outer elastomer bodies with smaller radial dimensions. This permits for the first time cooling that is optimally adapted to the local thermal loads, which results in the fact that an advantageous and particularly uniform load is acting on the elastomer material. This ensues the special advantage that both the transmittable power density and the useful life are increased.

With one embodiment of the invention, the elastomer bodies are mounted on common one-piece connection flanges. This means that several inner and outer elastomer bodies are directly attached by vulcanization to a radially through-extending connection flange. The connection flange may be a ring-shaped, single-piece flange, or it may be assembled from ring segments depending on the type of construction of the coupling. When assembled from ring segments, the individual elastomer bodies have the shape of ring segments as well.

According to a particularly advantageous alternative embodiment of the shaft coupling as defined by the invention, provision is made that the inner and outer elastomer bodies are provided with separate connection flange modules for forming transmission element modules, said connection flange modules being successively detachably connectable with each other radially. The special advantage of the present embodiment lies in the fact that shaft couplings can be built in different structural sizes from standardized modules like a modular system. For this purpose, the connection flange modules are peripherally provided with corresponding connection means, for example with drilled flange screw holes. The transmission element modules can be radially cascaded in this way, whereby the common connection flanges each are formed in their totality by the connection flange modules connected with one another.

The module-like structure has the manufacturing advantage that the transmission element modules can be made available stepped with different radii. Shaft couplings for different power classes can then be manufactured with low expenditure without requiring complicated and costly special production series.

A further advantage is that transmission element modules worn in the course of operation can be replaced with low expenditure, and that the fitness of a damaged coupling thus can be restored again within a short time.

The connection flange modules of the transmission element modules are usefully designed in such a way that they can be radially inserted into one another. In such an embodiment, the connection flange modules each project radially beyond the elastomer body. The inner and the outer modules are coordinated with one another in this connection in such a way that the connection flanges of the one module can be plugged radially between the connection flanges of the other module located next to it inwards or outwards. For connecting the connection flange modules with each other in a detachable manner, said modules have corresponding, drilled axial flange holes in the radial marginal zones permitting the modules to be screwed together. The modules are then secured by means of flange bolts.

As an alternative, the transmission element modules may be designed in a segmented form, or through-extending in the form of a ring. With the divided embodiment, the connection flange segments of the outer modules can be readily cascaded radially for mounting them. However, if the connection flange modules are designed in the form of a closed ring, they first have to assembled in the axial direction for their coaxial installation, and then connected with each other in a fixed way by means of suitable connection means, for example by screwing them together. Fastening elements such as, for example flange rings or the like that can be attached later can be employed for said purpose. According to an especially advantageous variation, which can be realized without such additional elements but nonetheless permits a symmetrically interlocked assembly, provision is made that the connection flange modules are designed in a bayonet-type way. In such an embodiment, the connection flanges have corresponding inner and outer bayonets with radial recesses and projections, so that in the mounting position, a flange ring can first be positioned in the axial direction beyond the next-smaller connection flange, and subsequently axially locked in the coaxially installed condition by a relative turn. The projections opposing each other in said locking position are then screwed to each other.

An outer elastomer body is preferably axially wider than an inner elastomer body. This takes into account the fact that the rated shear stress remains constant, viewed radially from the inside to the outside.

In order to achieve a still further enhanced adaptation to the actually occurring loads, it is advantageous that the axial width of the inner and outer elastomer increases more than proportionally at least by sections, viewed from the inside to the outside. The radial elastomer cross section thus is provided with a bell- or tulip-shaped cross section, viewed radially from the inside to the outside. This may relate to both each individual elastomer body and to the totality of the elastomer bodies in the shaft coupling. The local load can be rendered more uniform in this way and the useful life is prolonged accordingly.

Each transmission element may have axially throught-extending cooling windows for improving the cooling efficiency.

SUMMARY

Based on the explained drawbacks of the prior art the invention is based on the problem of providing an elastic shaft coupling which, taking into account the material-specific stressability of the elastomer, the low thermal conductivity of elastomers and the outwardly increasing load on the elastomer body, has a low ratio of peak to basic expansion and thus a useful life that is significantly prolonged.

In addition, cooling elements may be embedded in the elastomer body in an undetachable manner. Such cooling elements are structural elements made of material with good thermal conductivity, which extend in the elastomer through core areas with maximum heat development, and outer zones that are cooler in relation to the core zones. Such cooling elements therefore provide for effective heat dissipation from the critical zones. In a torsion element, said cooling elements are preferably realized in the form of axial metal cooling sheets that extent at least up to the outer surface of the respective elastomer body. If such metal cooling sheets project outwards, this has the advantage in terms of manufacturing that that they can be safely and solidly clamped in the protruding zones when the rubber is injected during the vulcanizing operation.

In order to optimize the connection of the elastomer body with the connection flanges also for the highest loads, it is advantageous that the connection flange has axially and/or radially projecting holding shoulders around which the elastomer body extends. Said holding shoulders are preferably provided in the form of ring shoulders with a rounded cross section. Superior adhesion of the vulcanized bond is achieved in this way in the particularly stressed marginal zones.

BRIEF DESCRIPTION OF THE DRAWINGS

Exemplified embodiments of the invention are explained in greater detail in the following with the help of the drawings, in which the following is shown in detail.

DETAILED DESCRIPTION

Figure 1:
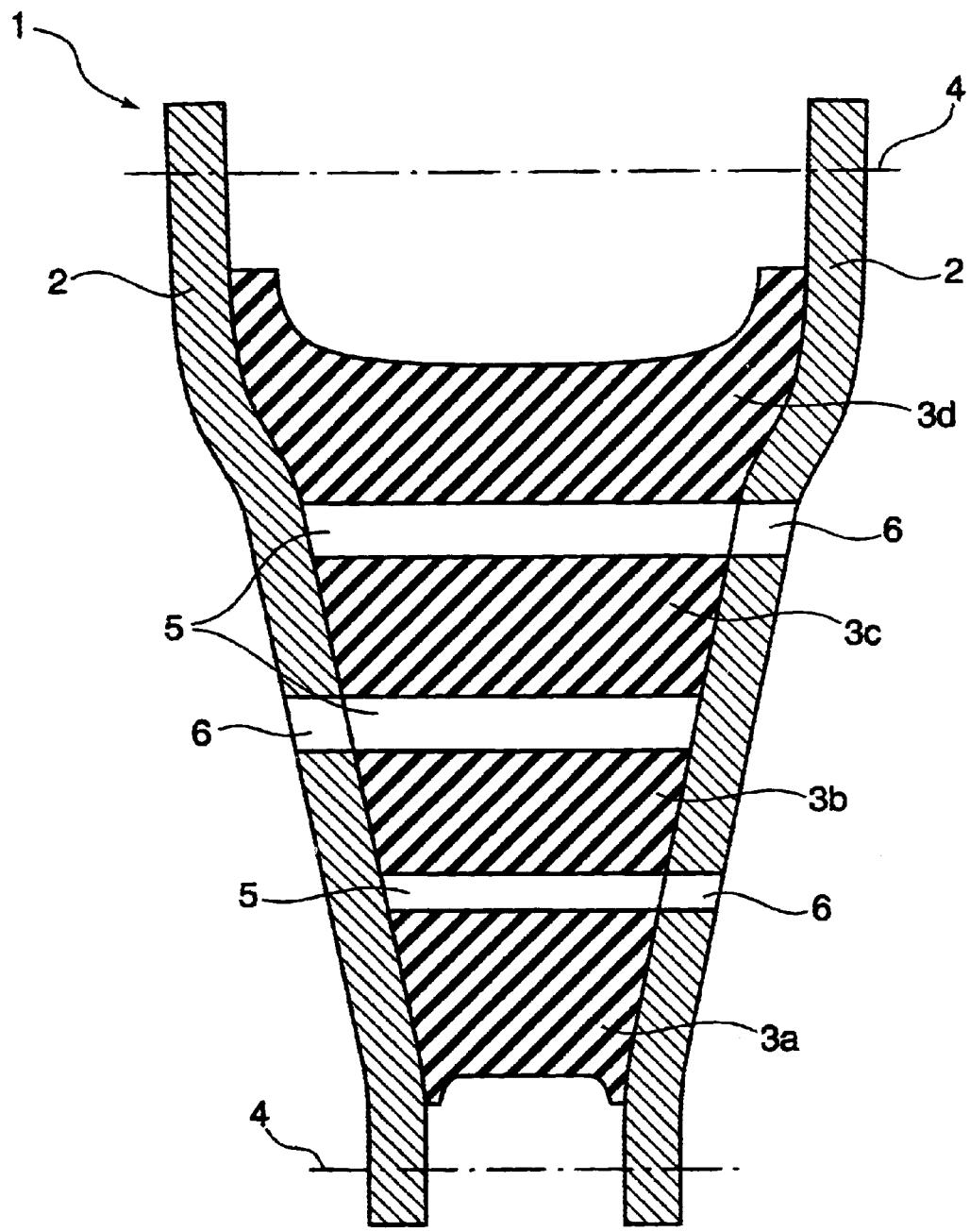
FIG. 1 shows a cross section through a first embodiment of a transmission element as defined by the invention.

FIG. 1 shows schematically a radial cross section through a torsion element as defined by the invention, which is denoted in said figure as a whole by reference numeral 1. The coupling axis "K" is located in the view shown at the bottom of the drawing.

The torsion element 1 may be both ring-shaped and segmented.

The torsion element 1 has the axial connection flanges 2 made of steel. Said connection flanges are attached to the rubber bodies 3a, 3b, 3c and 3d by vulcanizing.

The connection flanges 2 project radially beyond the rubber bodies 3a, 3b, 3c, 3d and are provided in said zones with the drilled axial flange holes 4. By means of screw bolts (not shown in detail), which are plugged into said drilled flange holes 4, it is possible to integrate the transmission element 1 in a drive train, or several of such transmission elements 1 can be radially cascaded.

Within their inner zone the connection flanges 2 are arranged in the form of a "V" in relation to each other. In this way, the axial width of the rubber bodies 3a, 3b, 3c, 3d located in between increases radially in a uniform manner from the inside to the outside. In the outer zone, the connection flanges 2 are widened toward the outside in a sweeping way in relation to each other without a sharp bend in the elastomer body-flange interface, so that the axial width of the rubber bodies 3 increases in said zone more than proportionally compared to the other rubber bodies. This results in the chalice- or bell-like shape as defined by the invention for the entire elastomer coupling body formed by the rubber bodies 3a, 3b, 3c, 3d.

The through-extending cooling channels 5 extend between the rubber bodies 3a, 3b, 3c and 3d in the peripheral direction.

The connection flanges 2 are provided with the cooling windows 6.

Figure 2:
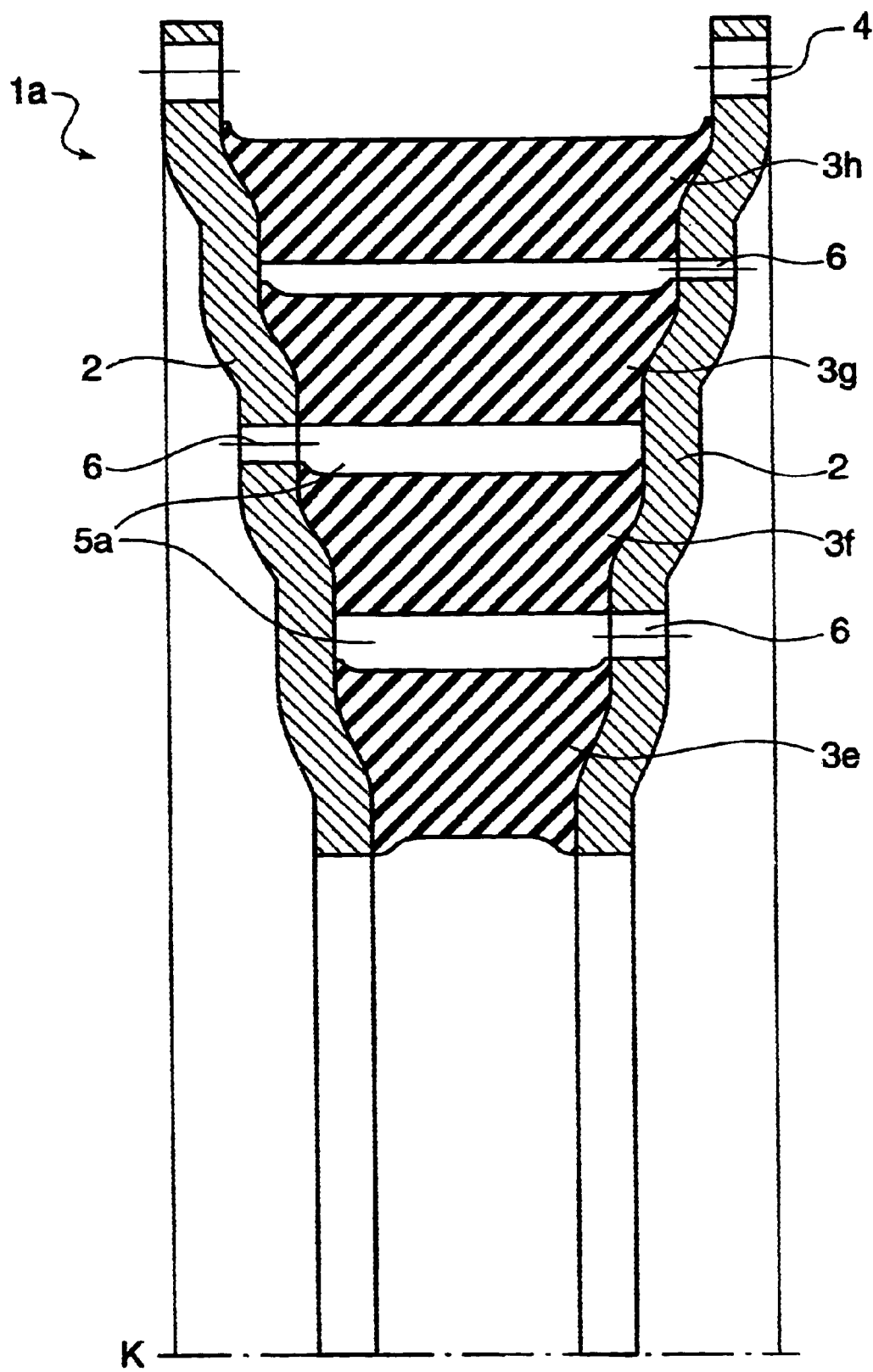
FIG. 2 shows a cross section through a second embodiment of a transmission element as defined by the invention.

FIG. 2 shows a torsion element 1a as defined by the invention by the same view as in FIG. 1, whereby the same reference numerals are used. As opposed to the embodiment shown in FIG. 1, each individual rubber body 3e, 3f, 3g, 3h has a tulip or bell shape viewed radially from the inside to the outside, i.e. its axial width increases more than proportionally to the outside by sections. In addition, the radial thickness of the rubber bodies decreases to the outside, so that a cooling is realized that is adapted in a superior way to the local load. Cooling channels 5a extend between rubber bodies 3e, 3f, 3g, 3h.

Figure 3:
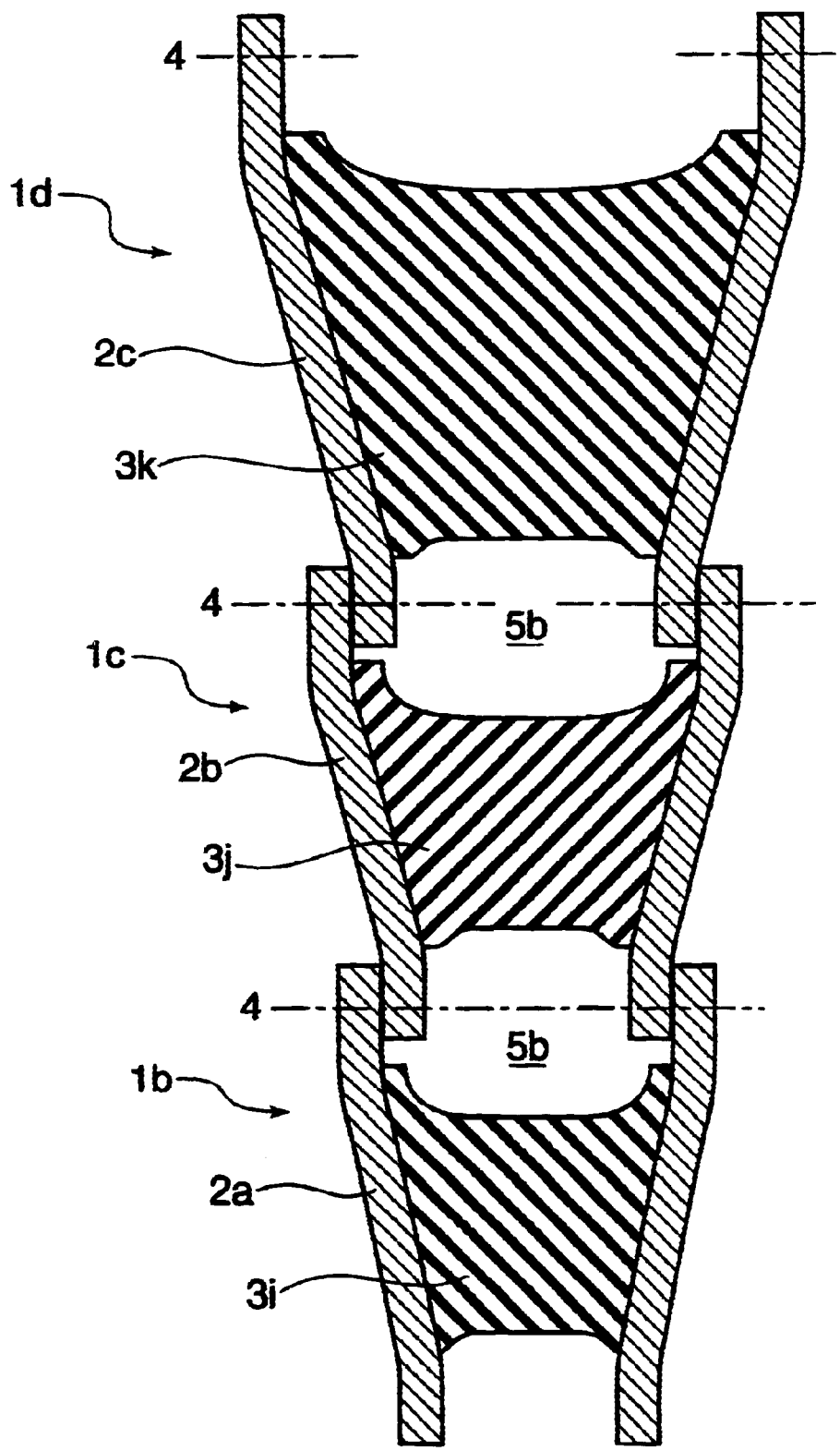
FIG. 3 shows a cross section through a shaft coupling assembled from transmission element modules as defined by the invention.

FIG. 3 shows a section through a shaft coupling embodied as defined by the invention, by the same view as the one in FIGS. 1 and 2, whereby the same reference numerals are used. As opposed to the embodiments shown in FIGS. 1 and 2, each individual rubber body 3i, 3j, and 3k is provided in this case with the separate connection flange modules 2a, 2b and 2c, respectively, so that the transmission modules 1b, 1c and 1d, respectively, are formed.

In each case radially outer transmission element modules 1b, 1c and 1d are inserted into the inner ones in the form of a cascade, whereby the connection flanges 2a, 2b and 2c overlap each other in each case in the zone of the drilled flange holes 4 and are connected there with each other by means of flange bolts not shown.

The rubber bodies 3i, 3j, and 3k each are provided with a tulip or bell-shaped cross section for each transmission element 1b, 1c and 1d as in FIG. 2.

The through-extending cooling channels 5b extend in the peripheral direction between the transmission element modules 1b, 1c and 1d, said modules being connected with each other in a detachable manner in the form of a modular system.

Depending on the power to be transmitted it is possible to cascade—as shown—three transmission element modules 1b, 1c and 1d or also only two or more. This permits optimal adaptation of the coupling to the torque to be transmitted. A particularly economical production is achieved via standardization of the transmission element modules 1b, 1c and 1d.

As an alternative, the transmission element modules 1b, 1c and 1d can be realized in the form of closed ring-shaped modules, or as segmented modules. The connection flanges 2a, 2b, 2c and the elastomer bodies 3i, 3j, and 3k then are one-piece or divided elements accordingly. With the ring-shaped form, the connection flanges 2a, 2b, 2c are preferably provided with corresponding radial projections and recesses in the form of a bayonet.

The transmission elements 1b, 1c and 1d shown in FIG. 3 likewise can be provided with the cooling windows 6 and the additional cooling channels 5b as shown in FIGS. 1 and 2.

Furthermore, cooling elements—not shown—can be embedded in the rubber bodies 3.

What is claimed is:

1. An elastic shaft coupling used as a transmission element comprising:
    at least one torsion element comprising:
        at least one elastically deformable elastomer body having a force input side and a force output side; and
        at least two axial connection flanges coupled in a fixed manner to said at least one elastically deformable elastomer body on said force input side and said force output side;
    wherein a torque is transmitted exclusively via rubber material of said at least one elastically deformable elastomer body;
    wherein an axial width of said at least one elastically deformable elastomer body increases radially from the inside to the outside, and at an outer radial zone of maximal extension said axial width of said at least one elastically deformable elastomer body increases radially more than proportionally;
    wherein said at least two axial connection flanges are chalice- or bell-shaped in a continuously sweeping form relative to one another in an interface formed by said at least one elastically deformable elastomer body and said at least two axial connection flanges.

2. The shaft coupling according to claim 1, wherein said at least one elastically deformable elastomer body comprises at least one inner elastomer body and at least one outer elastomer body, wherein said at least one inner elastomer body and said at least one outer elastomer body are arranged coaxially with a coupling axis with a radial spacing from each other and have a common connection flange of said at least two axial connection flanges on said force input side and said force output side.

3. The shaft coupling according to claim 2, wherein said at least one elastically deformable elastomer body comprises multiple bodies and wherein said multiple bodies are mounted on said at least two axial connection flanges, said at least two axial flanges comprising a single piece.

4. The shaft coupling according to claim 2, wherein said at least one outer elastomer body is axially wider than said at least one inner elastomer body.

* * * * *